(12) United States Patent
Sogabe et al.

(10) Patent No.: US 7,309,040 B2
(45) Date of Patent: Dec. 18, 2007

(54) MAGNETIC TAPE CARTRIDGE

(75) Inventors: Teruo Sogabe, Ibaraki (JP); Tsugihiro Doi, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 197 days.

(21) Appl. No.: 11/214,770

(22) Filed: Aug. 31, 2005

(65) Prior Publication Data

US 2006/0043228 A1  Mar. 2, 2006

(30) Foreign Application Priority Data

Sep. 2, 2004  (JP) ............................. 2004-256049

(51) Int. Cl.
*G11B 23/107* (2006.01)
(52) U.S. Cl. .................................... 242/348
(58) Field of Classification Search ............... 242/338, 242/338.1, 343, 343.1, 343.2, 348, 348.2; 360/132
See application file for complete search history.

(56) References Cited

U.S. PATENT DOCUMENTS 6,745,968 B1 * 6/2004 Schoettle et al. ........ 242/338.1
6,751,059 B2 * 6/2004 Morita et al. ............... 360/132
6,913,217 B2 * 7/2005 Ishihara .................... 242/338.1
6,929,207 B2 * 8/2005 Aaron et al. .............. 242/338.1
2002/0109028 A1 * 8/2002 Ishihara et al. .......... 242/348.2
2002/0166913 A1 * 11/2002 Ridl et al.

FOREIGN PATENT DOCUMENTS

JP          10-222837 A      8/1998
JP          2004-133997 A    4/2004

* cited by examiner

*Primary Examiner*—William A Rivera
(74) *Attorney, Agent, or Firm*—Birch, Stewart, Kolasch & Birch, LLP (57) ABSTRACT

There is provided a magnetic tape cartridge, including a cartridge (1) composed of a top cartridge (2) and a bottom cartridge (3), a reel (5) rotatably disposed in the cartridge (1), and a magnetic tape (4) wound onto the reel (5), in which a width (w) of the magnetic tape (4) is over 12.65 mm, a thickness (h) of the cartridge (1) is 32 mm or less, and the width (w) of the magnetic tape is 60% to 90% of the thickness (h) of the cartridge (1).

14 Claims, 9 Drawing Sheets

PRIOR ART

MAGNETIC TAPE CARTRIDGE

BACKGROUND OF THE INVENTION

The present invention relates to a magnetic tape cartridge suitable for high-density recording.

In recent years, means for high-speed information transmission such as optical fibers have attained considerable development, which makes it possible to transmit images and data sets containing enormous quantity of information, while at the same time, advanced technologies to record, reproduce and store these data sets are being required. Typical recording and reproducing media include flexible discs, magnetic drums, hard discs and magnetic tapes, and the magnetic tapes play a major role mainly as data backup medium since their recording capacity per reel is large. Today, with increase in the level of technology, the magnetic tapes are required to have higher recording capacity.

The magnetic tapes are applied to various uses such as audio tapes, video tapes and computer tapes. In the field of data backup tapes in particular, with increased capacity of hard discs which are targets of backup operation, magnetic tapes having a recording capacity of over 200 GB per reel have been produced on a commercial basis. In the future, mass-storage backup tapes with a capacity of over 1 TB are expected to be introduced to market, and therefore it is vital to develop magnetic tapes with high recording capacity.

The data backup magnetic tape is usually wound onto reels and used in the state of being housed in cartridge. The magnetic tape cartridges fall into two categories: a single reel type which houses one reel; and a double reel type which houses two reels.

Figure 13:
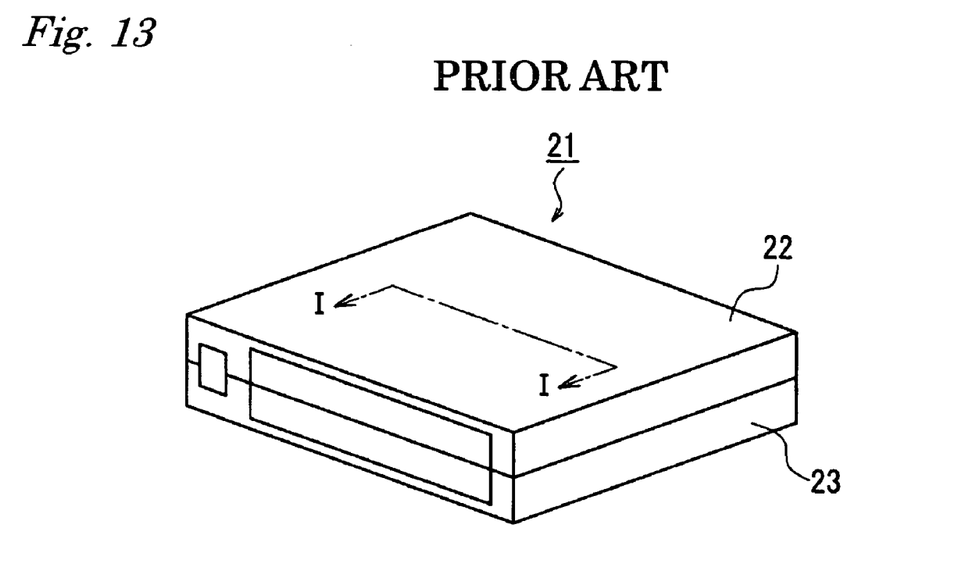
FIG. 13 is an outer perspective view showing a magnetic tape cartridge.
Figure 14:
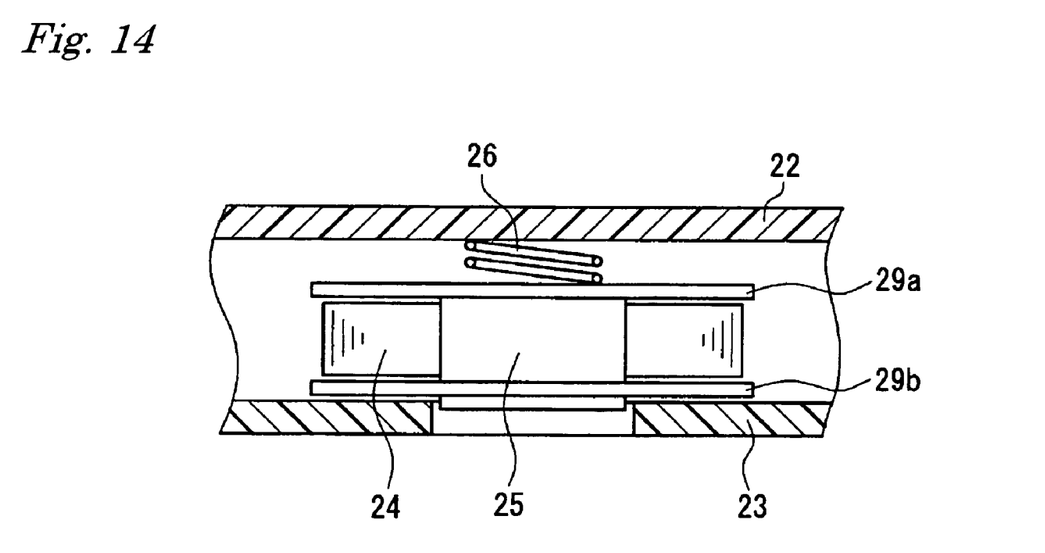
FIG. 14 is a fragmentary cross sectional view taken along line I-I in FIG. 13.
Figure 15:
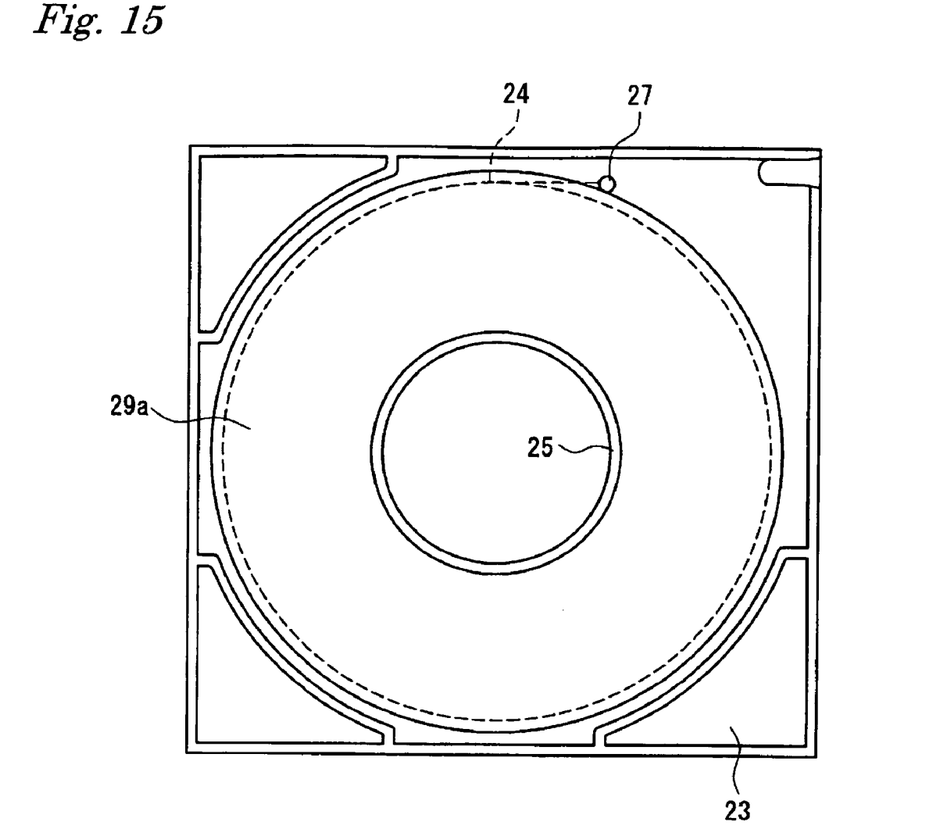
FIG. 15 is a plane view showing a cartridge 21 of FIG. 13 without a top shell 22.
Figure 16:
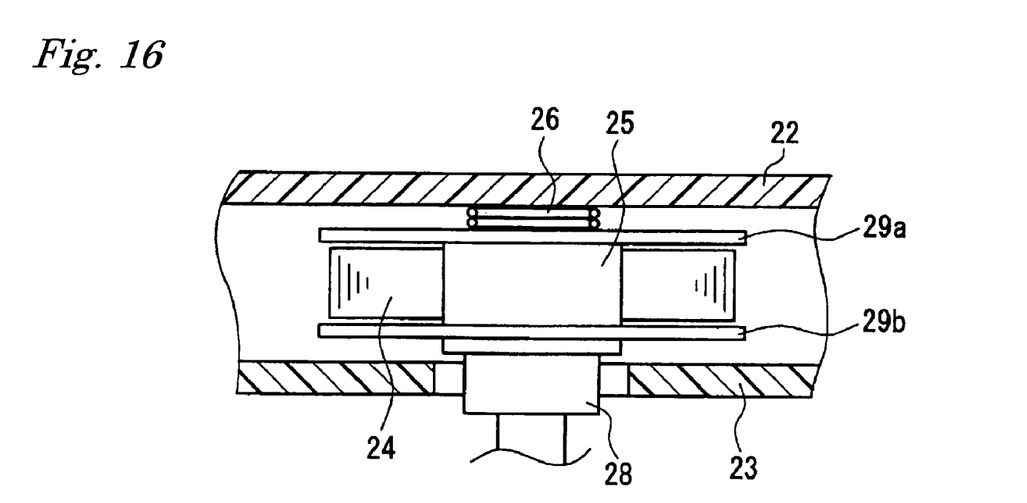
FIG. 16 is a fragmentary cross sectional view showing a position of a reel 25 when the magnetic tape 24 is loaded.

FIG. 13 is an outer perspective view showing a single reel-type magnetic tape cartridge. In FIG. 13, a cartridge 21 is composed of a top shell 22 and a bottom shell 23. FIG. 14 is a fragmentary cross sectional view taken along line I-I in FIG. 14. In FIG. 13, a magnetic tape 24 is wound onto a reel 25 having an upper flange 29a and a lower flange 29b. The reel 25, which is housed in between the top shell 22 and the bottom shell 23, is pressed toward the bottom shell 23 by a reel spring 26. As shown in FIG. 14, the magnetic tape 24 is stored in the state of being wound onto the reel 25. FIG. 15 is a plane view showing the cartridge 21 in FIG. 13 without the top shell 22. In FIG. 15, the reel 25 having the upper flange 29a and having the magnetic tape 24 wound therearound is mounted on the bottom shell 23. Moreover, in FIG. 15, a leader pin 27 for winding off the tape is attached to the fore end of the magnetic tape 24. FIG. 16 is a fragmentary cross sectional view showing a position of the reel 25 when the magnetic tape 24 is loaded. In FIG. 16, the reel 25 is lifted by a drive gear 28 and the magnetic tape 24 is positioned in the middle of the top shell 22 and the bottom shell 23.

As means to increase the recording capacity of the magnetic tape cartridges, a method for achieving high recording density of the magnetic tapes themselves, and a method for decreasing the thickness of the magnetic tapes to be housed so as to enlarge recording areas have been proposed (see, e.g., JP H10-222837 A and JP 2004-133997 A1). While these methods can enhance the recording capacity of the magnetic tape cartridges, they are still not enough to satisfy the demands.

Accordingly, a method for achieving high recording capacity by increasing the length of the magnetic tapes, and a method for achieving high recording capacity by increasing the width of the magnetic tapes are being studied. However, in each of these methods, the size of existing cartridges needs to be changed, which causes a problem that compatibility with conventional recording and reproducing devices cannot be secured. More particularly, the method for increasing the length of the magnetic tapes enlarges the winding diameter of the magnetic tapes, which makes it necessary to increase the size of the cartridges in the direction of the winding diameter. Further, the method for increasing the width of the magnetic tapes requires the thickness of the cartridges to be increased.

These problems are herein described in detail. The magnetic tape cartridges record and reproduce data in the state of being loaded onto recording and reproducing devices. As mass storage recording and reproducing devices, library-type recording and reproducing devices capable of loading a plurality of cartridges are used. The library-type recording and reproducing devices include those housing a plurality of cartridges in a magazine and loading a plurality of the magazines to record and reproduce data, and those having a plurality of cartridge housing slots on the inner wall of the recording and reproducing device and housing the cartridges in the housing slots to record and reproduce data.

Figure 17:
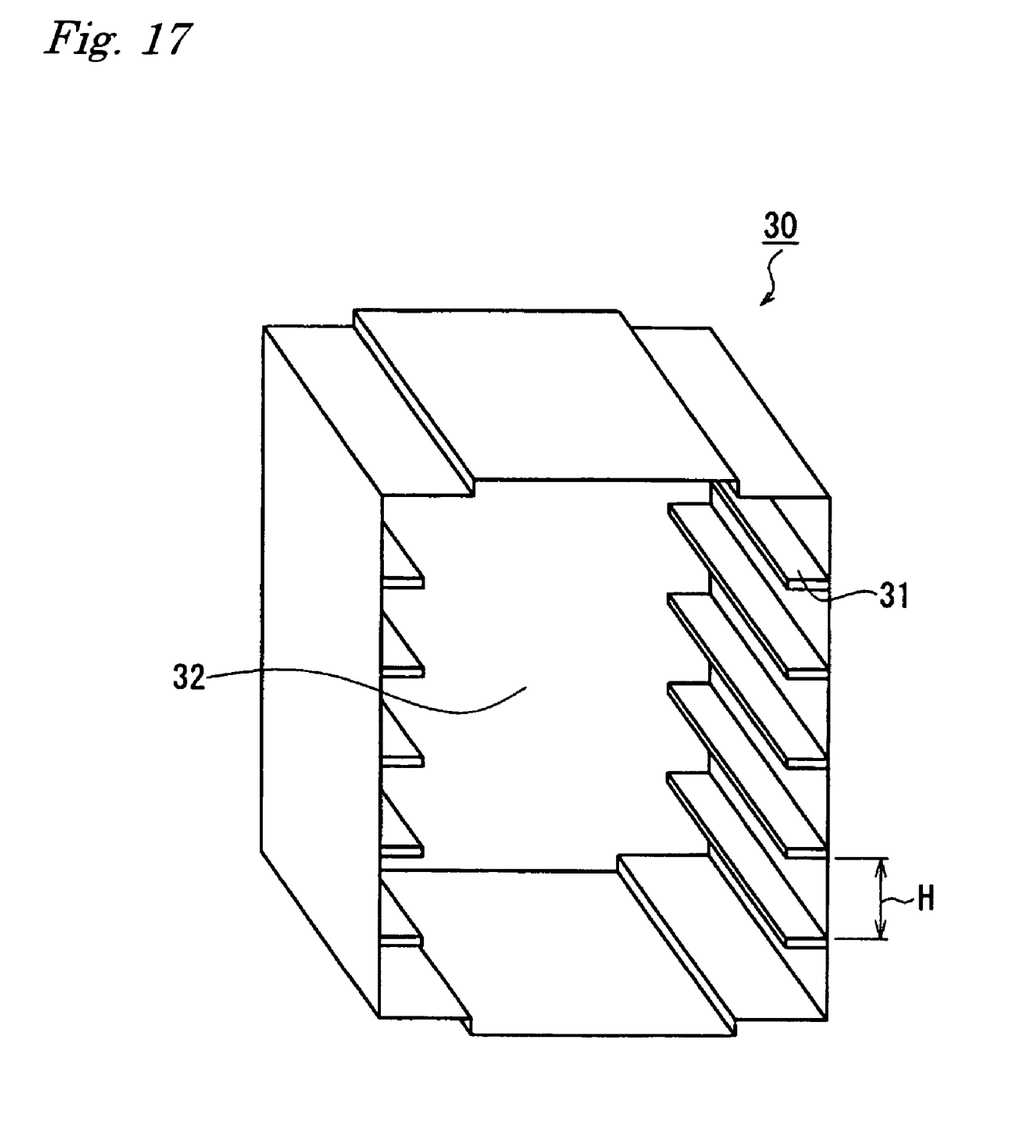
FIG. 17 is an outer perspective view showing one example of a magazine for use in a library-type recording and reproducing device.

FIG. 17 is an outer perspective view showing one example of the magazines for use in the library-type recording and reproducing devices. In FIG. 17, a magazine 30 has a cartridge housing space 32 formed by a plurality of partitions 31. Since cartridges vary in thickness, an interval H of the partitions 31 is set in conformity with the maximum thickness of existing cartridges. Also in the library-type recording and reproducing devices having cartridge housing slots, the size of housing space is set in conformity with the maximum size of existing cartridges. Consequently, changing the thickness or the size of cartridges beyond a certain limit means losing compatibility with the existing recording and reproducing devices.

SUMMARY OF THE INVENTION

An object of the present invention is to provide, for solving these problems, a means to achieve high recording capacity of a magnetic tape cartridge while securing compatibility with conventional recording and reproducing devices.

There is provided, in the present invention, a magnetic tape cartridge, including a cartridge composed of a plurality of shells, a reel rotatably disposed in the cartridge, and a magnetic tape wound onto the reel, in which a width of the magnetic tape is over 12.65 mm, a thickness of the cartridge is 32 mm or less, and the width of the magnetic tape is 60% to 90% of the thickness of the cartridge.

In the present invention, modifying components used in conventional magnetic tape cartridges allows increased recording capacity of a magnetic tape cartridge while securing compatibility with conventional recording and reproducing devices.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

One example of a magnetic tape cartridge of the present invention includes a cartridge composed of a plurality of shells, a reel rotatably disposed in the cartridge, and a magnetic tape wound onto the reel, in which a width of the magnetic tape is over 12.65 mm (½ inch), a thickness of the cartridge is 32 mm or less, and the width of the magnetic tape is 60% to 90% of the thickness of the cartridge. This makes it possible to enlarge a recording area of the magnetic tape and increase recording capacity without changing the size of conventional cartridges.

More specifically, the width of almost all the magnetic tape for use in the conventional magnetic tape cartridges, particularly the single reel-type magnetic tape cartridges having one reel is ½ inch, and therefore using the magnetic tape having a width over ½ inch can make the recording area larger than before.

The thickness of the cartridge is set to 32 mm or less so as to secure compatibility with existing recording and reproducing devices. More particularly, the width of the housing space of the existing recording and reproducing devices is 32 mm or less, and therefore setting the thickness of the cartridge at 32 mm or less makes it possible to secure compatibility with existing recording and reproducing devices.

Further, if the width of the magnetic tape is less than 60% of the thickness of the cartridge, a recording capacity increasing effect by an enlarged recording area cannot be achieved, and if the width is over 90%, then the space for existing components in the cartridge decreases, which inhibits essential functions of the magnetic tape cartridge.

It is to be understood that the present invention is applicable not only to the single reel-type magnetic tape cartridges but also to the double reel-type magnetic tape cartridges.

Embodiment 1

Figure 1:
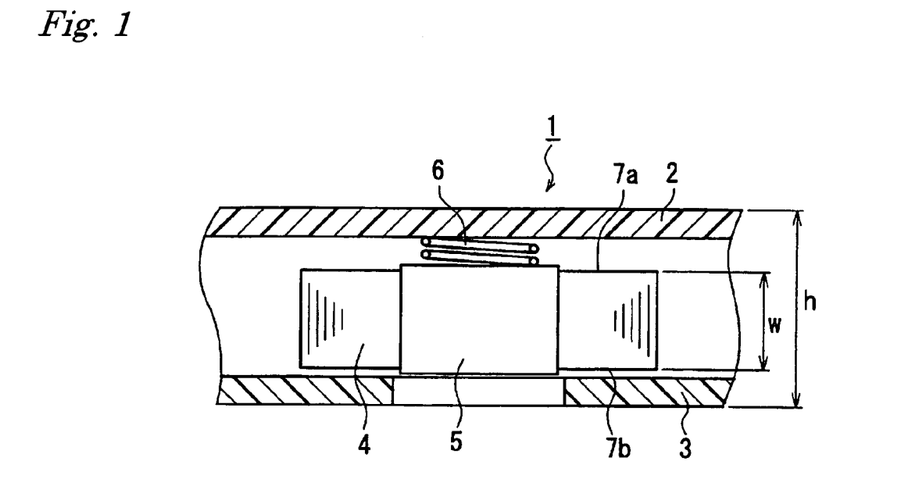
FIG. 1 is a fragmentary cross sectional view showing one example of a magnetic tape cartridge of the present invention.

FIG. 1 is a fragmentary cross sectional view showing one example of a magnetic tape cartridge of the present invention. In FIG. 1, a cartridge 1 is composed of a top shell 2 and a bottom shell 3. A magnetic tape 4 is wound onto a reel 5, and the reel 5 is housed in between the top shell 2 and the bottom shell 3. FIG. 1 also shows the magnetic tape 4 in a stored state, in which the reel 5 is pressed toward the bottom shell 3 by a reel spring 6.

Winding surfaces 7a, 7b of the magnetic tape 4 face the top shell 2 and the bottom shell 3 through a space section. More particularly, in the present embodiment, the reel 5 does not have an upper flange nor a lower flange. Therefore, the width of the magnetic tape 4 can be enlarged proportionally by the thickness of the upper flange and the lower flange, so that the width of the magnetic tape 4 can be over 12.65 mm (½ inch), a thickness h of the cartridge 1 can be 32 mm or less and the width w of the magnetic tape 4 can be 60% to 90% of the thickness h of the cartridge 1. More specifically, for example, the width w of the magnetic tape 4 is set to 19.05 mm (¾ inch) and the thickness h of the cartridge 1 is set to 26 mm, so that the width w of the magnetic tape 4 can be 73% of the thickness h of the cartridge 1.

As long as the width w of the magnetic tape 4 and the thickness h of the cartridge 1 can be set within these ranges, the size of each member for use in the present embodiment is not particularly limited. The material of each member for use in the present embodiment is not particularly limited either.

Embodiment 2

Figure 2:
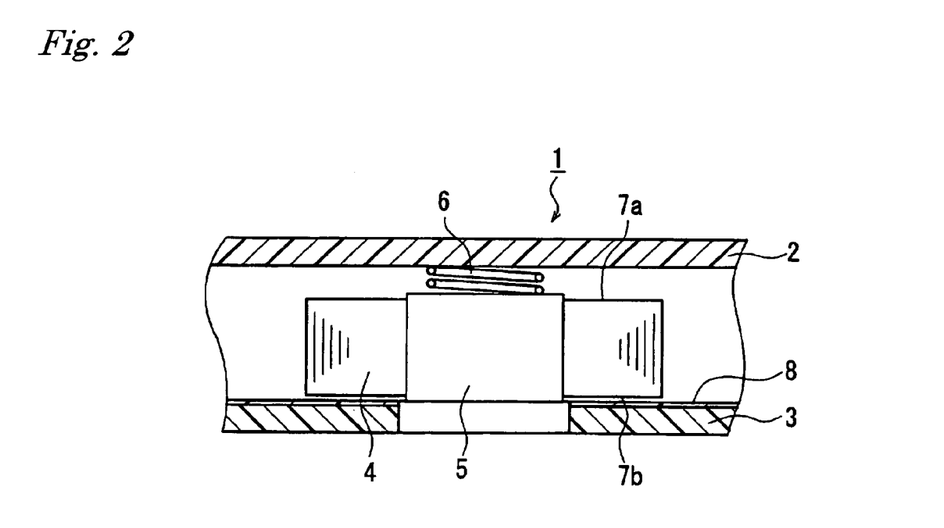
FIG. 2 is a fragmentary cross sectional view showing one example of the magnetic tape cartridge of the present invention.

FIG. 2 is a fragmentary cross sectional view showing one example of the magnetic tape cartridge of the present invention. The present embodiment shares the same structure with the embodiment 1 except that a cushioning member 8 is disposed on the surface of the bottom shell 3 facing the winding surface 7be of the magnetic tape 4. Disposing the cushioning member 8 allows damages on tape edges caused by contact between the magnetic tape 4 and the bottom shell 3 to be prevented. The thickness of the cushioning member 8 should preferably be 0.1 to 1.5 mm so as not to inhibit enlargement of the width of the magnetic tape 4. The cushioning member 8 should preferably be made from materials having smoothness and elasticity such as fluororesin and polyethylene terephthalate (PET).

Embodiment 3

Figure 3:
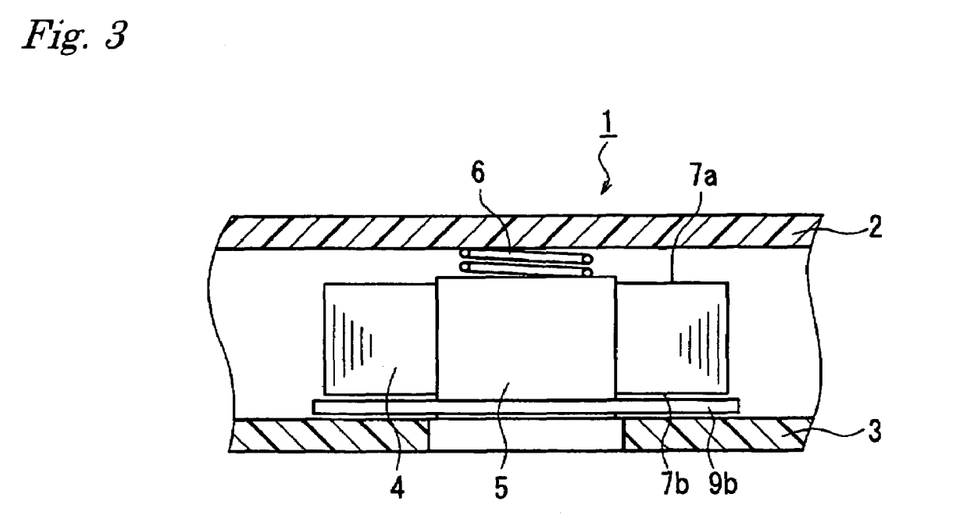
FIG. 3 is a fragmentary cross sectional view showing one example of the magnetic tape cartridge of the present invention.

FIG. 3 is a fragmentary cross sectional view showing one example of the magnetic tape cartridge of the present invention. The present embodiment shares the same structure with the embodiment 1 except that the reel 5 has a lower flange 9b on the side of the winding surface 7b of the magnetic tape 4. Disposing the lower flange 9b allows damages on tape edges caused by contact between the magnetic tape 4 and the bottom shell 3 to be prevented.

Embodiment 4

Figure 4:
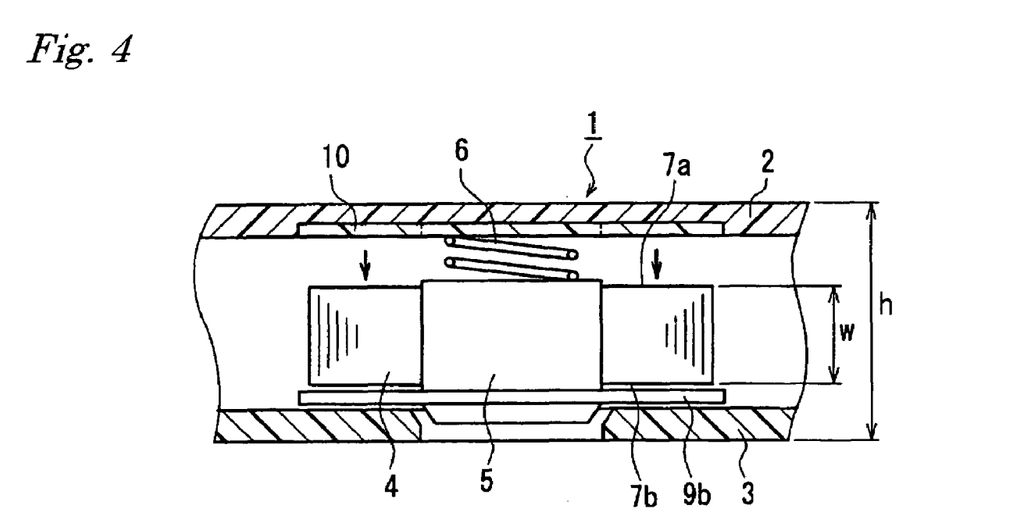
FIG. 4 is a fragmentary cross sectional view showing one example of the magnetic tape cartridge of the present invention.

FIG. 4 is a fragmentary cross sectional view showing one example of the magnetic tape cartridge of the present invention. In FIG. 4, a cartridge 1 is composed of a top shell 2 and a bottom shell 3. A magnetic tape 4 is wound onto a reel 5 having a lower flange 9b, and the reel 5 is housed in between the top shell 2 and the bottom shell 3. FIG. 4 also shows the magnetic tape 4 in a stored state, in which the reel 5 is pressed toward the bottom shell 3 by a reel spring 6. A winding surface 7a of the magnetic tape 4 faces the top shell 2 through a space section. More particularly, in the present embodiment, the reel 5 does not have an upper flange. Further, the top shell 2 has a movable flange 10. The movable flange 10 can be separated from the top shell 2 and be moved closer to the winding surface 7a of the magnetic tape 4.

Figure 5:
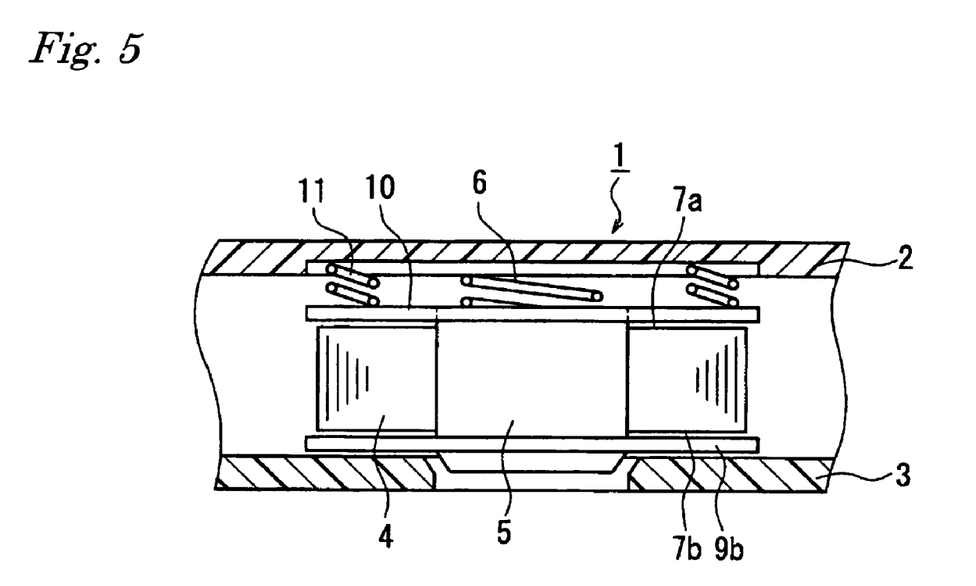
FIG. 5 is a fragmentary cross sectional view showing the state that a movable flange is moved.

FIG. 5 is a fragmentary cross sectional view showing the state that the movable flange is moved. In FIG. 5, the movable flange 10 is pressed by a spring 11 so as to-be closer to the winding surface 7a of the magnetic tape 4 The presence of the movable flange 10 and the lower flange 9b allows damages on tape edges caused by contact between the magnetic tape 4 and the top shell 2 as well as the bottom shell 3 to be prevented.

Moreover, in the stored state of the magnetic tape 4, the width of the magnetic tape 4 can be enlarged proportionally by the thickness of the upper flange, so that the width of the magnetic tape 4 can be over 12.65 mm (½ inch), the thickness h of the cartridge 1 can be 32 mm or less and the width w of the magnetic tape 4 can be 60% to 90% of the thickness h of the cartridge 1. More specifically, for example, the width w of the magnetic tape 4 is set to 16 mm and the thickness h of the cartridge 1 is set to 26 mm, so that the width w of the magnetic tape 4 can be 62% of the thickness h of the cartridge 1.

As long as the width w of the magnetic tape 4 and the thickness h of the cartridge 1 can be set within these ranges, the size of each member for use in the present embodiment is not particularly limited. The material of each member for use in the present embodiment is not particularly limited either.

Embodiment 5

Figure 6:
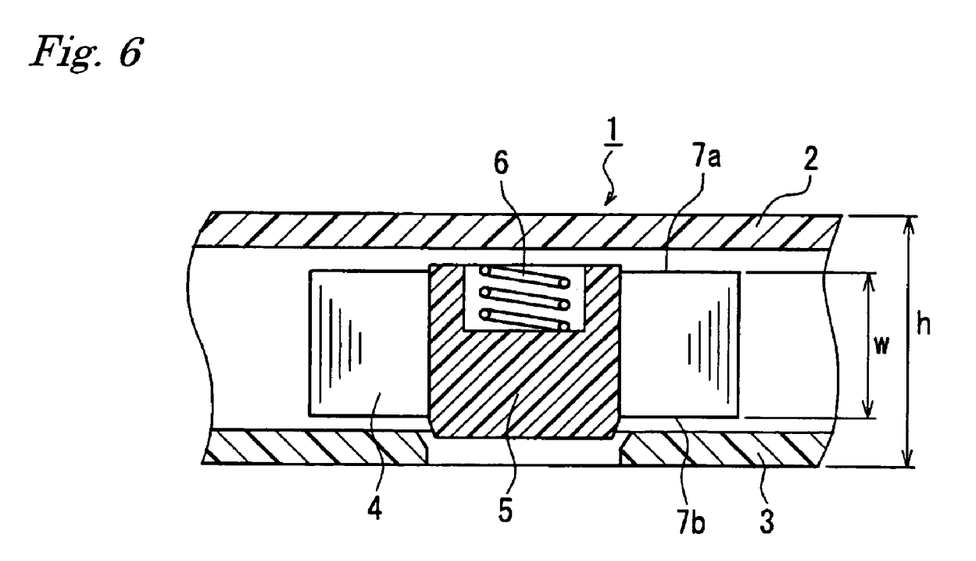
FIG. 6 is a fragmentary cross sectional view showing one example of the magnetic tape cartridge of the present invention.

FIG. 6 is a fragmentary cross sectional view showing one example of the magnetic tape cartridge of the present invention. In FIG. 6, a cartridge 1 is composed of a top shell 2 and a bottom shell 3. A magnetic tape 4 is wound onto a reel 5, and the reel 5 is housed in between the top shell 2 and the bottom shell 3. FIG. 6 also shows the magnetic tape 4 in a stored state, in which the reel 5 is pressed toward the bottom shell 3 by a reel spring 6 housed inside. More particularly, the reel spring 6 is housed inside the reel 5. Consequently, since the expansion space of the reel spring 6 can be secured inside the reel 5, the width of the magnetic tape 4 can be enlarged proportionally by the expansion space of the reel spring 6.

Moreover, winding surfaces 7a, 7b of the magnetic tape 4 respectively face the top shell 2 and the bottom shell 3 through a space section. More particularly, in the present embodiment, the reel 5 does not have an upper flange nor a lower flange. Therefore, the width of the magnetic tape 4 can be enlarged proportionally by the thickness of the upper flange and the lower flange.

With this, the width of the magnetic tape 4 can be over 12.65 mm (½ inch), a thickness h of the cartridge 1 can be 32 mm or less and the width w of the magnetic tape 4 can be 60% to 90% of the thickness h of the cartridge 1. More specifically, for example, the width w of the magnetic tape 4 is set to 19.05 mm (¾ inch) and the thickness h of the cartridge 1 is set to 22 mm, so that the width w of the magnetic tape 4 can be 87% of the thickness h of the cartridge 1.

As long as the width w of the magnetic tape 4 and the thickness h of the cartridge 1 can be set within these ranges, the size of each member for use in the present embodiment is not particularly limited. The material of each member for use in the present embodiment is not particularly limited either.

Embodiment 6

Figure 7:
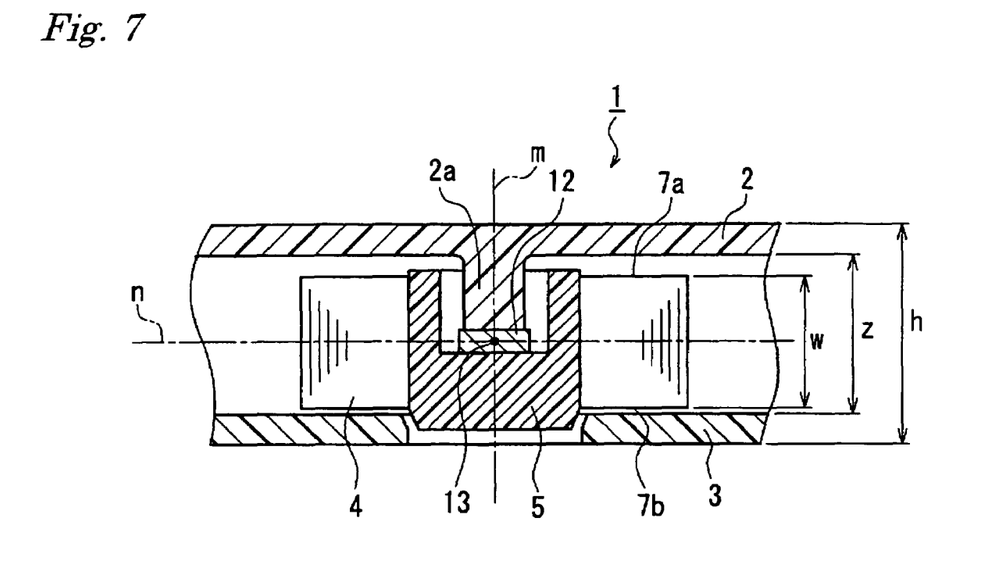
FIG. 7 is a fragmentary cross sectional view showing one example of the magnetic tape cartridge of the present invention.

FIG. 7 is a fragmentary cross sectional view showing one example of the magnetic tape cartridge of the present invention. In FIG. 7, a cartridge 1 is composed of a top shell 2 and a bottom shell 3. A magnetic tape 4 is wound onto a reel 5, and the reel 5 is housed in between the top shell 2 and the bottom shell 3. The top shell 2 has a rotation shaft 2a, and the reel 5 is rotatably connected to the rotation shaft 2a through a bearing 12.

Moreover, winding surfaces 7a, 7b of the magnetic tape 4 respectively face the top shell 2 and the bottom shell 3 through a space section. More particularly, in the present embodiment, the reel 5 does not have an upper flange nor a lower flange. Therefore, the width of the magnetic tape 4 can be enlarged proportionally by the thickness of the upper flange and the lower flange.

Further, in the present embodiment, a center 13 of the reel 5 is on a rotation center axis m of the reel 5. Moreover, the center 13 of the reel 5 is also on a running center line n of the magnetic tape 4. Therefore, in the present embodiment, when the magnetic tape 4 is shifted from the stored state to the loading state, it is not necessary to lift the reel 5. Consequently, almost all the inside dimensions z of the cartridge 1 may be equal to the width w of the magnetic tape 4.

With this, the width of the magnetic tape 4 can be over 12.65 mm (½ inch), a thickness h of the cartridge 1 can be 32 mm or less, and further, the width w of the magnetic tape 4 can be 60% to 90% of the thickness h of the cartridge 1. More specifically, for example, the width w of the magnetic tape 4 is set to 19.05 mm (¾ inch) and the thickness h of the cartridge 1 is set to 22 mm, so that the width w of the magnetic tape 4 can be 87% of the thickness h of the cartridge 1.

As long as the width w of the magnetic tape 4 and the thickness h of the cartridge 1 can be set within these ranges, the size of each member for use in the present embodiment is not particularly limited. The material of each member for use in the present embodiment is not particularly limited either.

Embodiment 7

Figure 8:
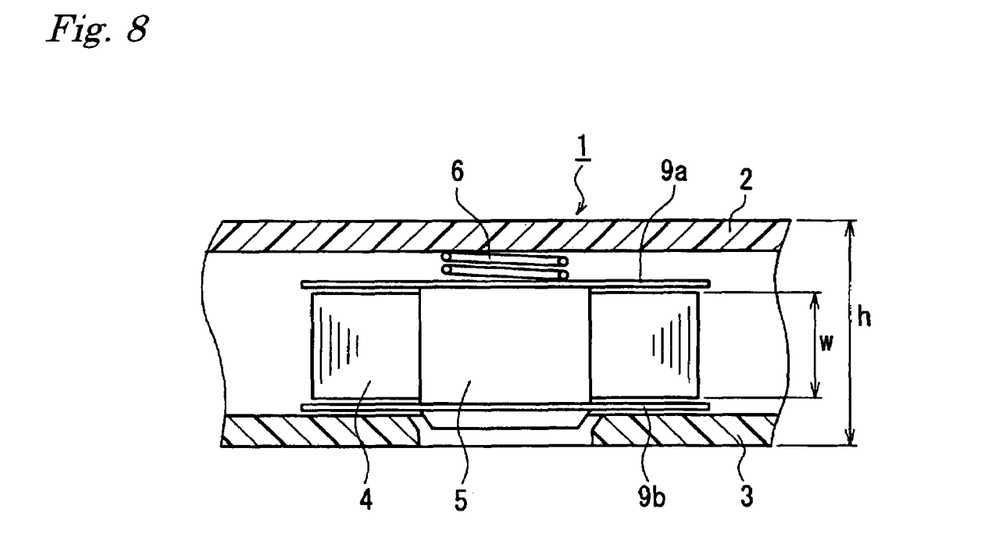
FIG. 8 is a fragmentary cross sectional view showing one example of the magnetic tape cartridge of the present invention.

FIG. 8 is a fragmentary cross sectional view showing one example of the magnetic tape cartridge of the present invention. In FIG. 8, a cartridge 1 is composed of a top shell 2 and a bottom shell 3. A magnetic tape 4 is wound onto a reel 5 having an upper flange 9a and a lower flange 9b, and the reel 5 is housed in between the top shell 2 and the bottom shell 3. FIG. 8 also shows the magnetic tape 4 in a stored state, in which the reel 5 is pressed toward the bottom shell 3 by a reel spring 6.

The upper flange 9a and the lower flange 9b are formed from metals. Metals to be used as the upper flange 9a and the lower flange 9b include aluminum, magnesium, titan, copper, nickel, alloys thereof, stainless steel, carbon steel, boron steel, nitriding steel and free-cutting steel and the like. With this, the upper flange 9a and the lower flange 9b can be formed thin with rigidity being maintained, and the width of the magnetic tape 4 can be enlarged proportionally by the upper flange 9a and the lower flange 9b being formed thin. Therefore, the width of the magnetic tape 4 can be over 12.65 mm (½ inch), a thickness h of the cartridge 1 can be 32 mm or less, and further, the width w of the magnetic tape 4 can be 60% to 90% of the thickness h of the cartridge 1. More specifically, for example, the width w of the magnetic tape 4 is set to 16 mm and the thickness h of the cartridge 1 is set to 22 mm, so that the width w of the magnetic tape 4 can be 73% of the thickness h of the cartridge 1.

As long as the width w of the magnetic tape 4 and the thickness h of the cartridge 1 can be set within these ranges, the size of each member for use in the present embodiment is not particularly limited. The material of each member for use in the present embodiment except the upper flange 9a and the lower flange 9b is not particularly limited either.

Embodiment 8

Figure 9:
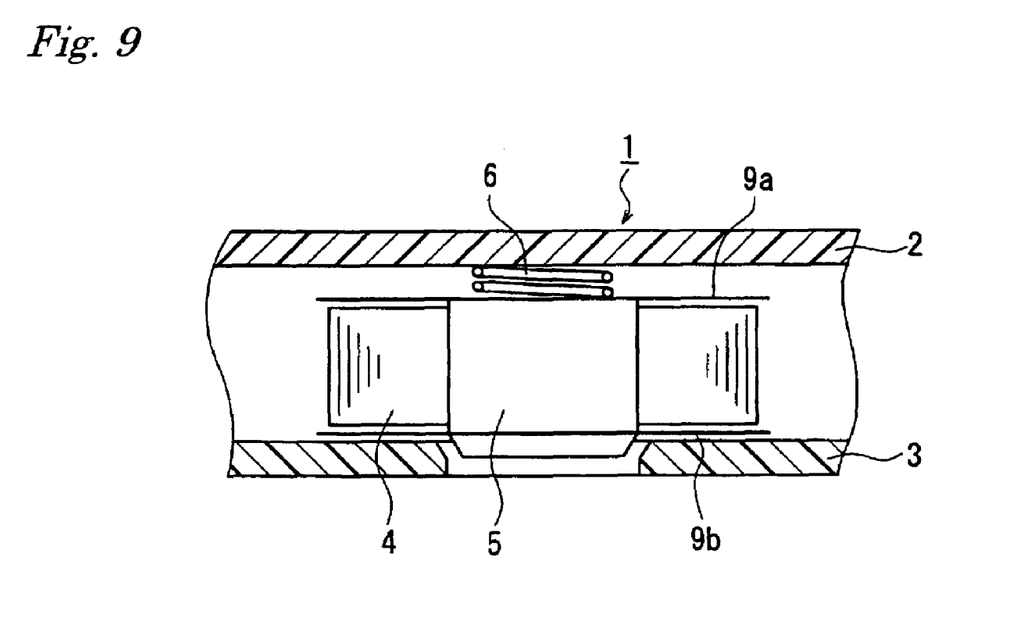
FIG. 9 is a fragmentary cross sectional view showing one example of the magnetic tape cartridge of the present invention.

FIG. 9 is a fragmentary cross sectional view showing one example of the magnetic tape cartridge of the present invention. The present embodiment shares the same structure with the embodiment 7 except that the upper flange 9a and the lower flange 9b of the reel 5 are formed from hard films. Usable hard films include fluororesin films, PET films, glass-fiber-reinforced polyester (FRP) films, glass-fiber-reinforced acrylic (FRA) films, polycarbonate (PC) films, and polymethylmethacrylate (PMMA) films and the like. This makes it possible to form the magnetic tape cartridge thin while the rigidity of the upper flange 9a and the lower flange 9b is maintained, by which the width of the magnetic tape 4 can be enlarged proportionally by the upper flange 9a and the lower flange 9b being formed thin.

Embodiment 9

Figure 10:
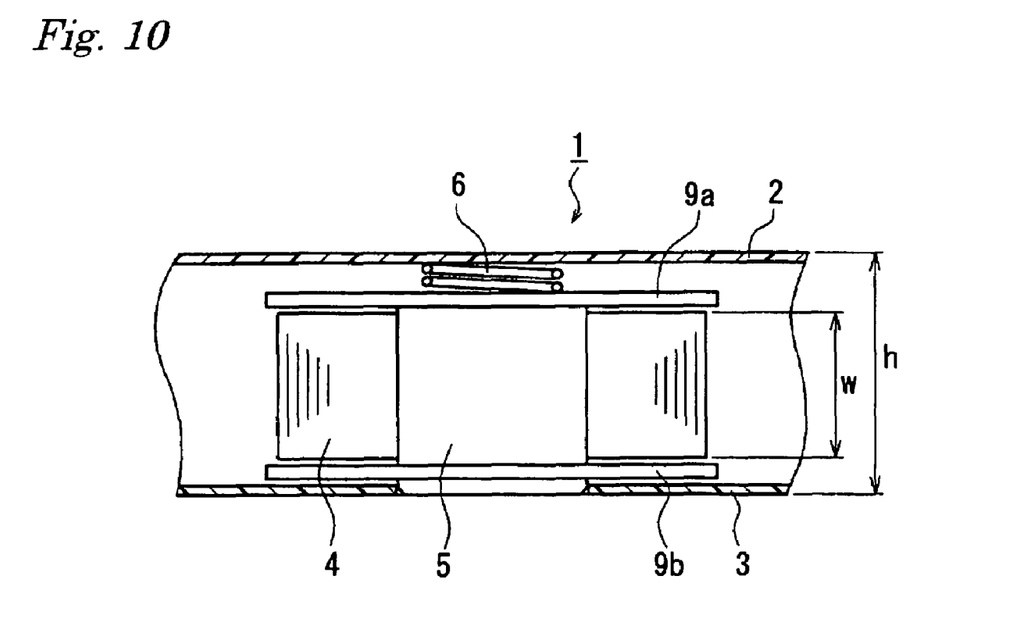
FIG. 10 is a fragmentary cross sectional view showing one example of the magnetic tape cartridge of the present invention.

FIG. 10 is a fragmentary cross sectional view showing one example of the magnetic tape cartridge of the present invention. In FIG. 10, a cartridge 1 is composed of a top shell 2 and a bottom shell 3. A magnetic tape 4 is wound onto a reel 5 having an upper flange 9a and a lower flange 9b, and the reel 5 is housed in between the top shell 2 and the bottom shell 3. FIG. 10 also shows the magnetic tape 4 in a stored state, in which the reel 5 is pressed toward the bottom shell 3 by a reel spring 6.

Moreover, the top shell 2 and the bottom shell 3 are formed from metals. Metals to be used as the top shell 2 and the bottom shell 3 include aluminum, magnesium, titan, copper, nickel, alloys thereof, stainless steel, carbon steel, alloy steel, nitriding steel and free-cutting steel and the like. With this, the top shell 2 and the bottom shell 3 can be formed thin with rigidity being maintained, and the width of the magnetic tape 4 can be enlarged proportionally by the upper flange 9a and the lower flange 9b being formed thin. Therefore, the width of the magnetic tape 4 can be over 12.65 mm (½ inch), a thickness h of the cartridge 1 can be 32 mm or less, and further, the width w of the magnetic tape 4 can be 60% to 90% of the thickness h of the cartridge 1. More specifically, for example, the width w of the magnetic tape 4 is set to 19.05 mm (¾ inch) and the thickness h of the. cartridge 1 is set to 26 mm, so that the width w of the magnetic tape 4 can be 73% of the thickness h of the cartridge 1.

As long as the width w of the magnetic tape 4 and the thickness h of the cartridge 1 can be set within these ranges, the size of each member for use in the present embodiment is not particularly limited. The material of each member for use in the present embodiment except the top shell 2 and the bottom shell 3 is not particularly limited either.

Embodiment 10

Figure 11:
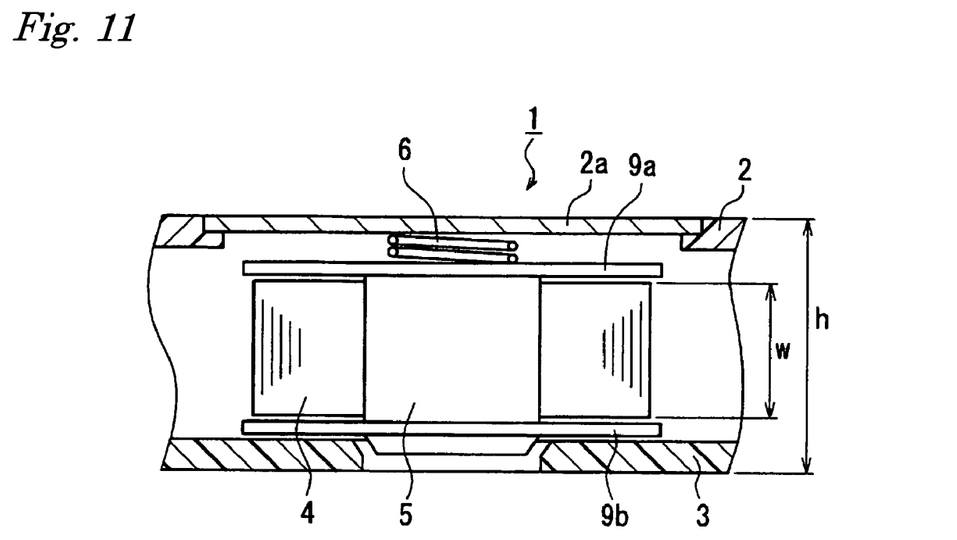
FIG. 11 is a fragmentary cross sectional view showing one example of the magnetic tape cartridge of the present invention.

FIG. 11 is a fragmentary cross sectional view showing one example of the magnetic tape cartridge of the present invention. In FIG. 11, a cartridge 1 is composed of a top shell 2 and a bottom shell 3. A magnetic tape 4 is wound onto a reel 5 having an upper flange 9a and a lower flange 9b, and the reel 5 is housed in between the top shell 2 and the bottom shell 3. FIG. 11 also shows the magnetic tape 4 in a stored state, in which the reel 5 is pressed toward the bottom shell 3 by a reel spring 6.

Moreover, the top shell 2 has a thin-walled section 2a in a portion facing the upper flange 9a. This allows the width of the magnetic tape 4 to be enlarged proportionally by the thinned portion of the top shell 2. Therefore, the width of the magnetic tape 4 can be over 12.65 mm (½ inch), a thickness h of the cartridge 1 can be 32 mm or less, and further, the width w of the magnetic tape 4 can be 60% to 90% of the thickness h of the cartridge 1. More specifically, for example, the width w of the magnetic tape 4 is set to 16 mm and the thickness h of the cartridge 1 is set to 22 mm, so that the width w of the magnetic tape 4 can be 73% of the thickness h of the cartridge 1.

As long as the width w of the magnetic tape 4 and the thickness h of the cartridge 1 can be set within these ranges, the size of each member for use in the present embodiment is not particularly limited. The material of each member for use in the present embodiment is not particularly limited, though the thin-walled section 2b of the top shell 2 should preferably be made of metals described in embodiment 9 for maintaining its strength.

Embodiment 11

Figure 12:
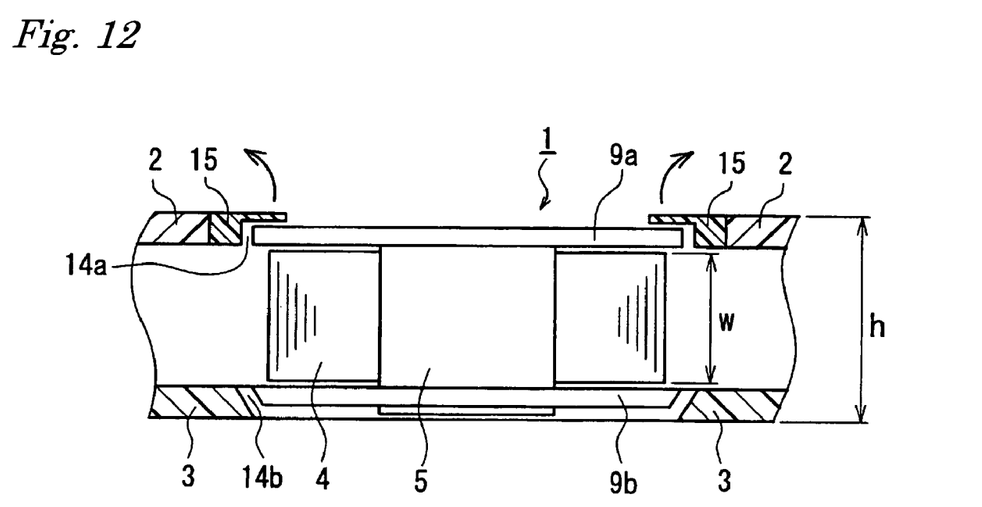
FIG. 12 is a fragmentary cross sectional view showing one example of the magnetic tape cartridge of the present invention.

FIG. 12 is a fragmentary cross sectional view showing one example of the magnetic tape cartridge of the present invention. In FIG. 12, a cartridge 1 is composed of a top shell 2 having an aperture 14a and a bottom shell 3 having an aperture 14b. A magnetic tape 4 is wound onto a reel 5 having an upper flange 9a and a lower flange 9b. The upper flange 9a is positioned inside the aperture 14a of the top shell 2, while the lower flange 9b is positioned inside the aperture 14b of the bottom shell 3. More particularly, the upper flange 9a has a function similar to the top shell 2, while the lower flange 9b has a function similar to the bottom shell 3. Further, a lock member 15 for controlling the rotation of the reel 5 is mounted on an edge section of the aperture 14a of the top shell 2. When the magnetic tape 4 is loaded, the lock member 15 is lifted in an arrow direction in FIG. 12 and is unlocked.

The upper flange 9a and the lower flange 9b respectively have the functions similar to the top shell 2 and the bottom shell 3, so that the width of the magnetic tape 4 can be enlarged proportionally by the thickness of the upper flange 9a and the lower flange 9b. Therefore, the width of the magnetic tape 4 can be over 12.65 mm (½ inch), a thickness h of the cartridge 1 can be 32 mm or less, and further, the width w of the magnetic tape 4 can be 60% to 90% of the thickness h of the cartridge 1. More specifically, for example, the width w of the magnetic tape 4 is set to 16 mm and the thickness h of the cartridge 1 is set to 26 mm, so that the width w of the magnetic tape 4 can be 62% of the thickness h of the cartridge 1.

As long as the width w of the magnetic tape 4 and the thickness h of the cartridge 1 can be set within these ranges, the size of each member for use in the present embodiment is not particularly limited. The material of each member for use in the present embodiment is not particularly limited either.

Although in the present embodiment, the upper flange 9a and the lower flange 9b are structured to function as the top shell 2 and the bottom shell 3 respectively, either one of the upper flange 9a and the lower flange 9b may be structured to function as the top shell 2 or the bottom shell 3.

According to the present invention as disclosed above, high recording capacity of the magnetic tape cartridge can be achieved while compatibility with conventional recording and reproducing devices is secured, which makes it possible to satisfy market needs of mass storage backup tapes, and therefore the magnetic tape cartridge of the present invention is of high industrial value.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A magnetic tape cartridge, comprising a cartridge composed of a plurality of shells; a reel rotatably disposed in the cartridge; and a magnetic tape wound onto the reel, wherein
   a width of the magnetic tape is over 12.65 mm,
   a thickness of the cartridge is from 22 mm to 32 mm, and
   the width of the magnetic tape is 60% to 90% of the thickness of the cartridge.

2. The magnetic tape cartridge as defined in claim 1, wherein oak one reel is provided.

3. The magnetic tape cartridge as defined in claim 1, further comprising a spring for pressing the reel, wherein at least one of winding surfaces of the magnetic tape faces the shell through a space section.

4. The magnetic tape cartridge as defined in claim 3, wherein a cushioning member is disposed on a surface of the shell facing the winding surface of the magnetic tape.

5. The magnetic tape cartridge as defined in claim 3, wherein a flange is disposed on one side of the winding surfaces of the magnetic tape.

6. The magnetic tape cartridge as defined in claim 3, wherein a flange is disposed on one side of the winding surfaces of the magnetic tape, and part of the shell can move closer to the other winding surface of the magnetic tape.

7. The magnetic tape cartridge as defined in claim 3, wherein the spring is housed inside the reel.

8. The magnetic tape cartridge as defined in claim 1, wherein the shell has a rotation shaft, and the rotation shaft and the reel are connected via a bearing.

9. The magnetic tape cartridge as defined in claim 1, further comprising a spring for pressing the reel, wherein the reel has an upper flange and a lower flange, which are formed from metal.

10. The magnetic tape cartridge as defined in claim 1, further comprising a spring for pressing the reel, wherein the reel has an upper flange and a lower flange, which are formed from hard turns.

11. The magnetic tape cartridge as defined in claim 1, wherein the shell is formed from metal.

12. The magnetic tape cartridge as defined in claim 1, further comprising a spring for pressing the reel, wherein the reel has an upper flange and a lower flange, and the shell has a thin-walled section m a portion facing at least one of the upper flange and the lower flange.

13. The magnetic tape cartridge as defined in claim 1, wherein the reel has an upper flange and a lower flange, which are disposed inside an aperture of the shell.

14. The magnetic tape cartridge as defined in claim 13, wherein the shell has a lock member for fix ma the reel.

* * * * *

UNITED STATES PATENT AND TRADEMARK OFFICE
CERTIFICATE OF CORRECTION

PATENT NO. : 7,309,040 B2  
APPLICATION NO. : 11/214770  
DATED : December 18, 2007  
INVENTOR(S) : Teruo Sogabe et al.

Page 1 of 1

It is certified that error appears in the above-identified patent and that said Letters Patent is hereby corrected as shown below:

Claim 2, column 10, line 4:

The phrase "wherein oak one" should read as --wherein only one--.

Claim 10, column 10, line 31:

The phrase "formed from hard turns." should read as --formed from hard films.--.

Claim 12, column 10, line 37:

The phrase "section m a portion" should read as --section in a portion--.

Claim 14, column 10, line 43:

The phrase "for fix ma" should read as --for fixing--.

Signed and Sealed this

Nineteenth Day of August, 2008

JON W. DUDAS  
*Director of the United States Patent and Trademark Office*